(12) United States Patent
Terrell et al.

(10) Patent No.: US 6,578,828 B2
(45) Date of Patent: Jun. 17, 2003

(54) LIVESTOCK COOLING SYSTEM

(76) Inventors: Michael E. Terrell, 3801 S. Barberry Pl., Chandler, AZ (US) 85248; Frank Gilbert Marks, 3340 S. 107th Ave., Tolleson, AZ (US) 85353

( * ) Notice: Subject to any disclaimer, the term of this patent is extended or adjusted under 35 U.S.C. 154(b) by 26 days.

(21) Appl. No.: 09/967,678

(22) Filed: Sep. 28, 2001

(65) Prior Publication Data

US 2003/0064677 A1 Apr. 3, 2003

(51) Int. Cl.$^7$ .................................................. B01F 3/04
(52) U.S. Cl. ........................................ 261/30; 119/436
(58) Field of Search ........................... 119/436; 261/30, 261/79.2; 454/328, 337

(56) References Cited

U.S. PATENT DOCUMENTS

| 4,443,387 A | 4/1984 | Gordon | |
|---|---|---|---|
| 4,476,809 A | 10/1984 | Bunger | |
| 4,693,852 A | 9/1987 | Gordon | |
| 5,747,833 A | 5/1998 | Hammer | |
| 6,014,948 A | 1/2000 | Gordon | |
| 6,059,865 A | * 5/2000 | Poteat | 96/236 |
| 6,079,365 A | 6/2000 | Medlin | |
| 6,293,121 B1 | * 9/2001 | Labrador | 62/304 |
| 6,409,157 B1 | * 6/2002 | Lundin et al. | 261/94 |

* cited by examiner

*Primary Examiner*—Harold Joyce

(57) ABSTRACT

A livestock cooling system creates an environment for protecting the health and productivity of animals, particularly dairy cows. One or more cooling fans are connected to programmable oscillation means, enabling the herds man to program fan oscillation according to the location of the livestock. Water is injected under high pressure into the air stream of the fans to create a fog. The system is also programmable according to various environmental conditions, including temperature, humidity, and wind velocity. The pressure and volume of the injected water are programmable and may be adjusted by the controller according to the observed environmental conditions. The disclosed system provides a cool and healthy environment for livestock, where the environment is programmed to track the animals according to the time of day and the location of shade.

16 Claims, 8 Drawing Sheets

LIVESTOCK COOLING SYSTEM

BACKGROUND OF THE INVENTION

Figure 1:
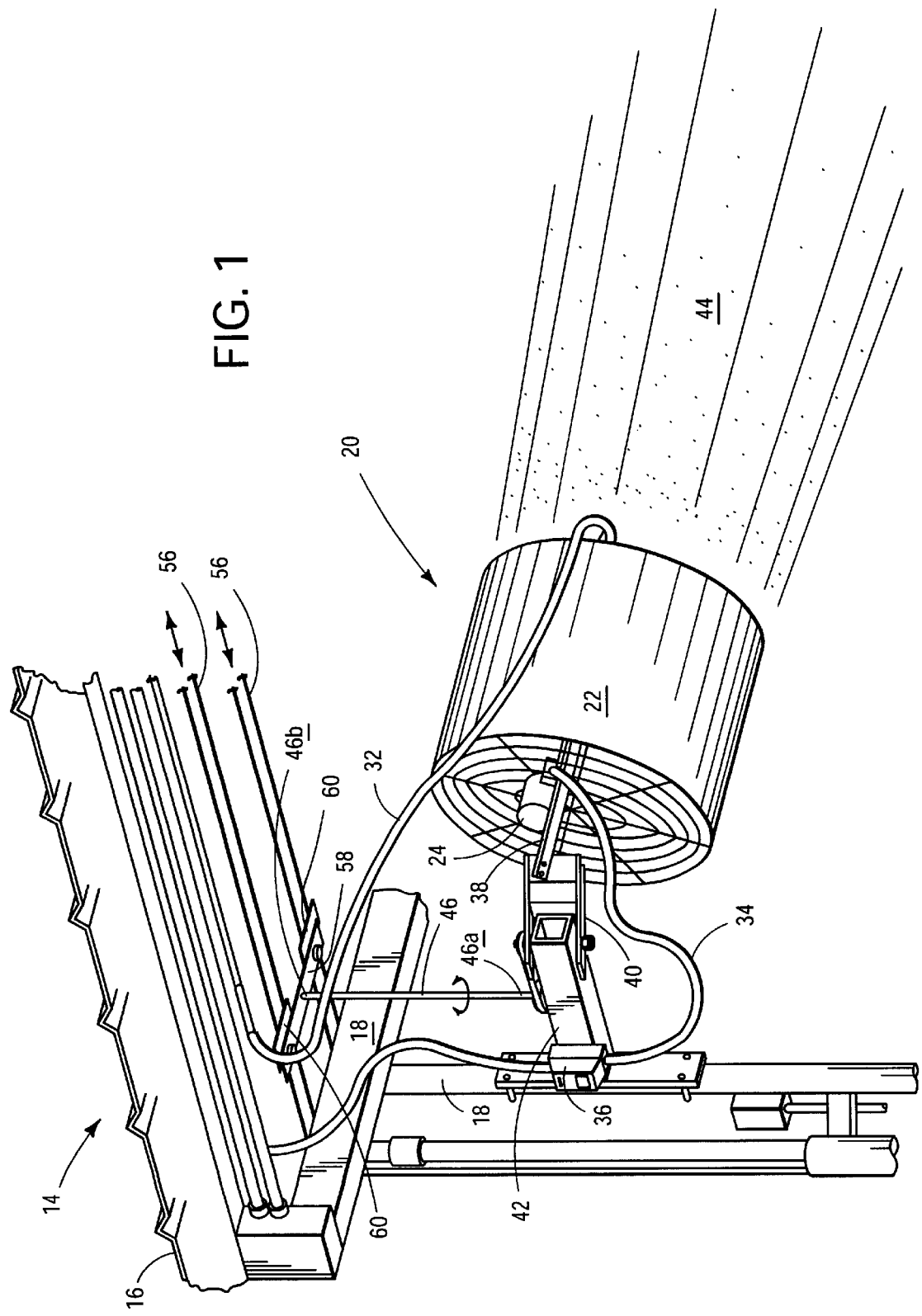
Figure 2:
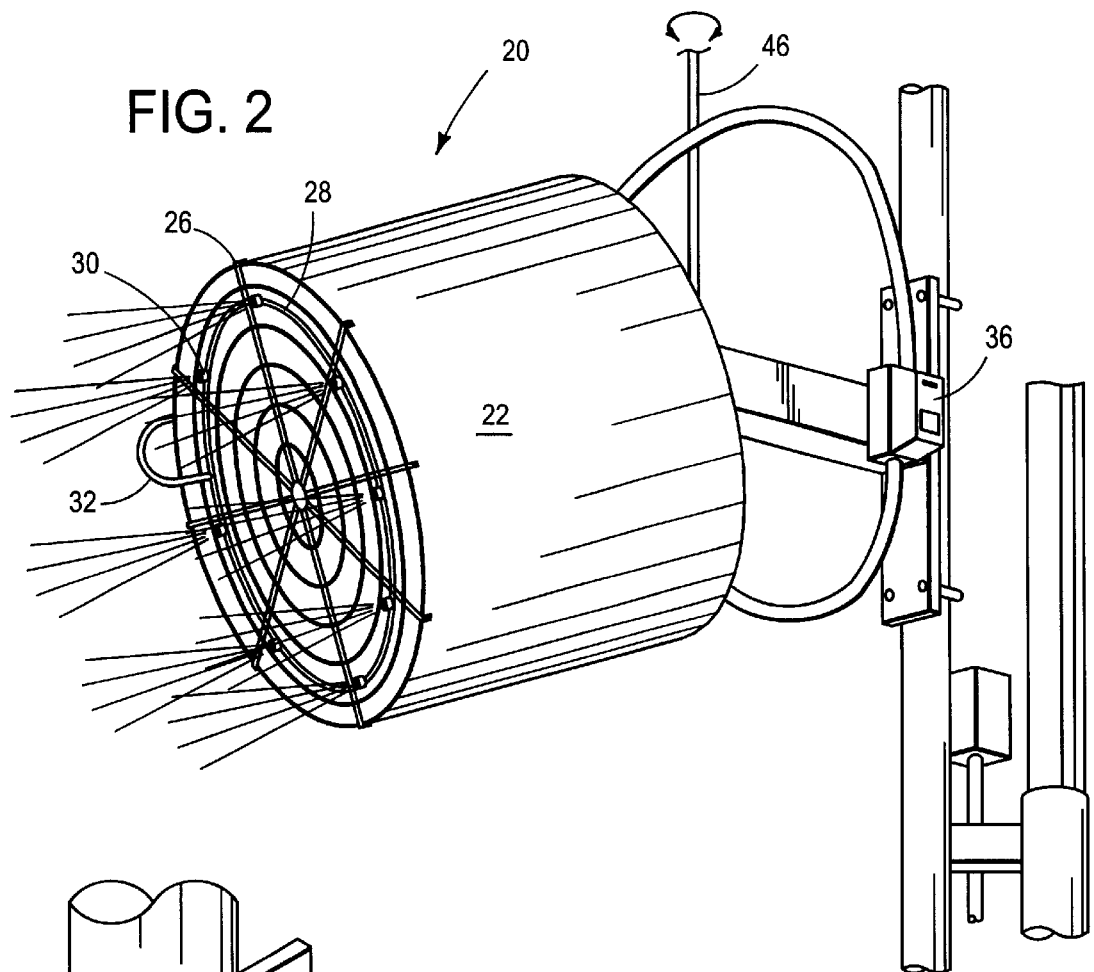
Figure 3:
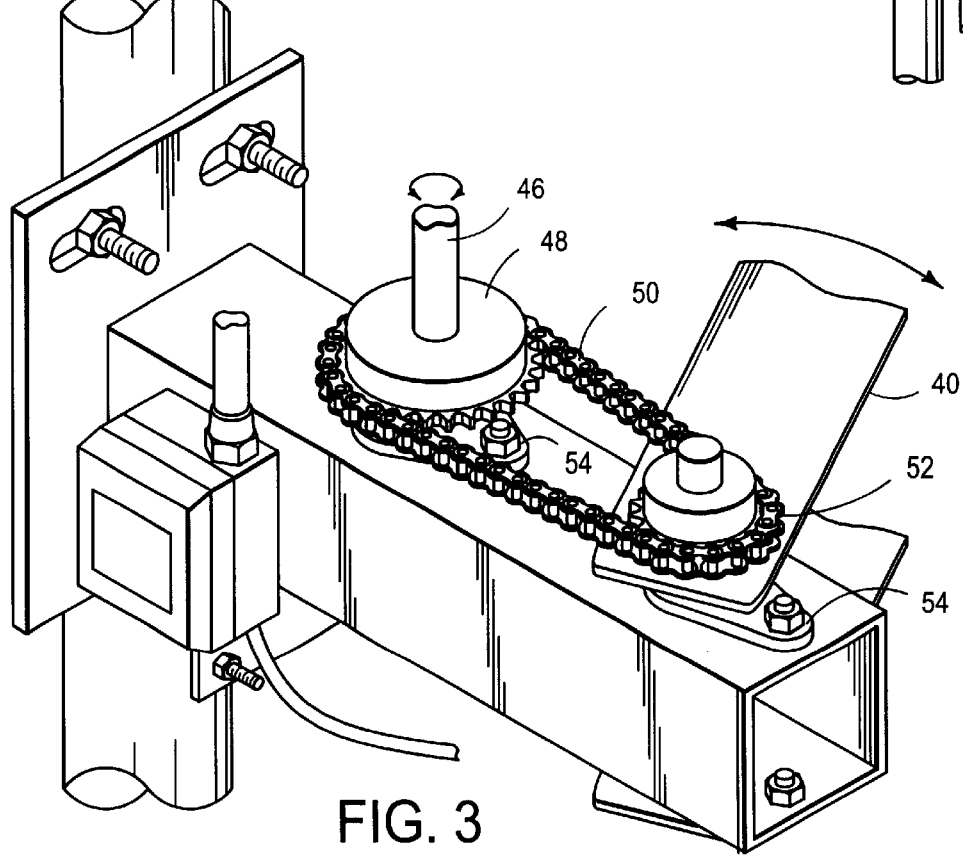

The present invention generally relates to devices and systems for sheltering livestock and more specifically to a programmable system for efficiently using evaporative cooling devices to create an environment which protects the health and productivity of the animals.

It is known in animal agriculture to cool livestock with evaporative cooling by wetting the animal and then drying the animal through mechanical ventilation or via natural ventilation. Alternatively, lowering the temperature of the environment will also cool animals if the decreased temperature may be maintained. The disclosed system provides cooling to livestock through direct evaporative cooling and also by decreasing the temperature of the livestock environment.

The disclosed system may deliver water to a given area without wetting the area, unlike the other known devices which wet one area continuously and usually result in wet bedding. With the disclosed system, by the time a fan oscillates back to the original zone, water previously emitted has partially or totally evaporated. The disclosed system allows the wetting-drying cycle to be accelerated or decelerated to maximize evaporative cooling given current environmental conditions. Temperature and humidity are monitored so that the maximum amount of water for evaporative cooling can be supplied to each fan under real time environmental conditions. The upper constraint on the amount of water delivered by each fan will usually be a volume of water which would wet the animal's bedding. Other environmental conditions may also be monitored, such as wind velocity, the intensity of sunlight, or the position of the sun with respect to the location of the livestock and a shading structure.

The disclosed system can be configured to emit water at high pressure so as to result in flash evaporation of the extremely small water particles which come into contact with any warm surface such as the skin of an animal or person. The result is a cool animal environment with little wetting of the animal's hair-coat and virtually no wetting of the animal's bedding.

Each fan within a fan circuit can be stopped and started in any position. The oscillation of a fan circuit is totally programmable. The oscillation of a fan circuit can be concentrated in a particular degree range at certain times of the day to increase animal comfort. The speed at which each fan circuit oscillates is programmable through the entire range of oscillation. A faster oscillation speed may be desired in areas prone to wetting, such as free-stall beds. Alternatively, slower oscillation may be desired in other areas, such as over cement alleyways. Programming can be changed at any time to meet the individual preferences of the animal herds person.

Water output can be varied according to a pre-programmed schedule or through constant monitoring of current environmental conditions. Current temperature, humidity and wind conditions may be monitored and water output controlled accordingly by a variable-frequency-drive on the high-pressure water pump. Water output may also be controlled by switching nozzle sizes, instead of or in addition to changing pump pressure output. In conjunction with programmable oscillation, programmable water output allows the herds person to fine tune the animal's environment for maximum economic gain and animal comfort.

Typical Applications of the Disclosed System

Dry-Lot Dairies

A typical dry-lot dairy application of the disclosed system is to provide a range of oscillation for a fan circuit, where the fan air stream is directed under the shade structure during those times of day when the shade, and therefore the cows, are underneath the shade structure. As the sun travels across the sky the shade produced moves away from the shade structure. The cows follow the shade away from the shade structure. The programmable nature of the disclosed system allows a fan circuit to follow the shade and oscillate in the area where cooling is needed.

Free-Stall Dairies

In a free-stall dairy application, fans within a fan circuit may be mounted at the feed lane, between the free-stall beds, or on the outer columns of the building. The mounting arrangement chosen can optimize any prevailing winds. A fan circuit may be programmed to oscillate from the outer alley of the building to the feed lane. This oscillation action completely cools the living area of the cows. A novel feature of the disclosed system is that a fan circuit may be programmed to put out more water while oscillating over the cement alleys, and less water while oscillating across free-stall beds. In addition, the speed at which a fan circuit oscillates can be decreased over the cement alleys and/or increased over the beds. This feature of the disclosed system prevents the build-up of water on the free-stall beds which can be hazardous to the health of the livestock. Wet bedding is an ideal environment for microorganism growth which can result in a cow contracting mastitis, or inflammation of the mammary gland.

During feeding times, fans within a fan circuit can either be parked at a fixed direction or the oscillation range of the fan circuit restricted, so the fans cool the feeding area intensively while the cows are eating and/or just after the cows return from the milking barn.

Saudi Style (A.K.A. Beach Barns)

In a Saudi Style Barn, popular in hot-dry climates such as Arizona and Mid-Eastern Countries, fan circuits mounted on the feed lanes result in effective cooling of the entire barn. Other mounting arrangements such as outer-building support posts can be utilized to take advantage of any prevailing winds. As with free-stall barns, the fans can be programmed for cooling the cows at the feed lane more intensively during feeding times and/or after milking.

SUMMARY OF THE INVENTION

The present invention is directed to a livestock cooling system which creates an environment which protects the health and productivity of the animals. The livestock cooling system comprises a structure, the structure comprising a roof connected to supporting members, at least one electrically-powered fan creating an air stream, the fan rotatably coupled to the structure, oscillation means connected to the fan for rotating the fan through a plurality of rotational positions, means for injecting water droplets into the air stream of the fan, at least one sensing device positioned to sense environmental conditions and adapted to produce a signal in response to said conditions, and input/output means for receiving the signal produced by the sensing device and outputting a signal limiting the plurality of rotational positions through which the fan is rotated. The livestock cooling system may further comprise controller means for controlling the oscillation means and the means for injecting water droplets into the air stream. The controller means comprise, in part, a plurality of sensing devices positioned to sense environmental conditions and adapted to produce a signal in response to those conditions, a position indication device to determine the rotational position of the fan, where the position indication device is adapted to produce a signal in response to the rotational position. The controller means further comprise programmable input/output means adapted for receipt and storage of input from the sensing devices and the fan position indication device, where the programmable input/output means is formed to produce an output signal based upon the input received from the sensing devices and the position indication device. Power means are adapted to receive a signal produced by the programmable input/output means, where the power means are coupled to the oscillation means for operation of the oscillation means. Pressure control means are adapted to receive a signal produced by the programmable input/output means, where the pressure control means are coupled to the means for injecting water droplets into the air stream for controlling the output pressure of the same.

A variety of different environmental conditions may be sensed by the sensing devices and inputted to the controller means, including temperature, humidity, wind velocity, intensity of sunlight, and the position of the sun with respect to the structure.

The disclosed system may comprise a single circuit of fans controlled by a local control panel, or a plurality of fan circuits, wherein each circuit is controlled by a local control panel, and each local control panel is in communication with a master control panel. A remote supervisory station may be included in this system to send and receive signals to and from the master control panel, so that an entire system of fans may be monitored and/or controlled from the remote supervisory station.

These and other features, aspects, and advantages of the present invention will become better understood with regard to the following description, appended claims, and accompanying drawings.

BRIEF DESCRIPTION OF THE DRAWINGS

FIG. 1 is an isometric view of a typical fan of the disclosed livestock cooling system.

FIG. 2 is a second isometric view of a fan of the disclosed cooling system.

FIG. 3 is a detailed view of one embodiment of a drive mechanism for fan oscillation.

FIG. 4 is an isometric view of one embodiment for placement of an oscillation motor and pump motor.

FIG. 5 shows how a plurality of fans may be programmed to oscillate in the morning.

FIG. 6 shows how a plurality of fans may be programmed to oscillate at mid-day.

FIG. 7 shows how a plurality of fans may be programmed to oscillate in the afternoon.

FIG. 8 is a schematic drawing showing the configuration of a typical local control panel.

FIG. 9 is a schematic drawing showing the configuration of a master control panel.

FIG. 10 is a schematic drawing showing one embodiment of the disclosed monitoring and control system.

DETAILED DESCRIPTION OF THE EMBODIMENTS

Referring now specifically to the drawings, FIG. 1 shows a structure 14 having a roof 16 connected to supporting members 18. Mounted within the structure 14, is at least one fan 20. FIGS. 1 and 2 show the major components of a typical fan 20 used in the disclosed system. Depending upon the particular application, a plurality of similar fans 20 may be used in the system. Each fan comprises a blade, not shown, enclosed within housing 22, a motor 24 attached to the housing 22 for rotating the blade, a grill 26 attached to the front of the housing 22, a mist ring 28 attached to the grill 26, nozzles 30 connected to the mist ring 28, a water supply line 32 for providing high pressure water to the nozzles 30, power cable 34 for providing electrical power to the motor 24, motor starter 36 for starting motor 24, and mounting bracket 38, which supports the weight of fan 20. Mounting bracket 38 is connected to pivot arm 40 which is rotationally attached to stationary member 42, which is attached to a supporting member 18 or other member of the structure 14. Fan 20 creates an air stream 44 into which water droplets are injected from the nozzles 30 mounted within the mist ring 28. Water is provided to the mist ring 28 by high pressure water line 32.

Oscillation means are provided to the disclosed system which allows each fan to oscillate within a pre-programmed arc, up to a maximum of 270 degrees for the embodiment shown in FIGS. 1 and 3. Various oscillation means may be operably attached to the fan 20, which rotate the fan through a plurality of rotational positions. In one embodiment, the oscillation means comprise a drive shaft 46, having a first end 46A and a second end 46B, to which drive shaft 46 means for rotational motion are applied so as to rotate drive gear 48. Drive gear 48 imparts rotation to pivot arm 40 by use of a chain 50 connected to free gear 52, thereby causing oscillation of fan 20. Drive gear 48, which is attached to first end 46A, and free gear 52 are supported by bearings 54. Alternatively, chain 50 may be eliminated by directly enmeshing drive gear 48 to free gear 52 to provide direct drive.

Various means for applying rotational motion to drive shaft 46 are available. In the embodiment disclosed in FIG. 1, cables 56 are connected to drive shaft flange 58, attached to second end 46B, by drive shaft clamps 60. Instead of using drive shaft flange 58, it is also possible to connect cables 56 to a drum attached to drive shaft 46. If a drum is used, it is possible to increase the maximum arc of oscillation to a value greater than 270 degrees.

As an alternative to cables 56, other linkage means known in the art may be utilized, such as rods. As further shown in FIG. 1, cables 56 may extend past drive shaft flange 58 and provide rotational motion to additional drive shafts 46 causing oscillation of additional fans 20. As shown in FIG. 4, cables 56 are connected to the shaft of oscillation motor 62 by oscillation clamps 64. As further shown in FIG. 4, cables 56 may extend in both directions from oscillation motor 62, so fans 20 may be placed on either side of oscillation motor 62.

Oscillation motor 62 is electrically connected to the oscillation motor variable frequency drive 66, such as a Series No. VSD07 manufactured by SQD. As depicted in FIG. 8, the variable frequency drive 66 may be located within the local control panel 68. A programmable controller 70, such as a IDEC Microsmart series, is also contained within the local control panel 68. The programmable controller 70 is equipped with a central processing unit, a real time clock module, a RS 485 module, an analog input and output module, digital input modules and digital output modules.

The rotational position of each fan 20 is sensed by a position indication device 72, which may be mounted either at each individual fan 20 or preferably, because fewer position indication devices 72 are required, at the oscillation motor 62 which drives a circuit of fans. The position indication device 72 is adapted to produce a signal in response to the rotation of the fan 20, as monitored directly from the fan 20, or in response to the rotation of the oscillation motor 62, which will provide a signal indicating the position of each fan 20 being driven by the oscillation motor 62. The output signal from the position indication device 72 is transmitted to the local control panel 68. An acceptable position indication device is a series 755 encoder available through Encoder Products Corp. of Sand Point, Id., or a Rotary Cam available through Electro Cam Corp. of Concord, Ontario.

Figure 4:
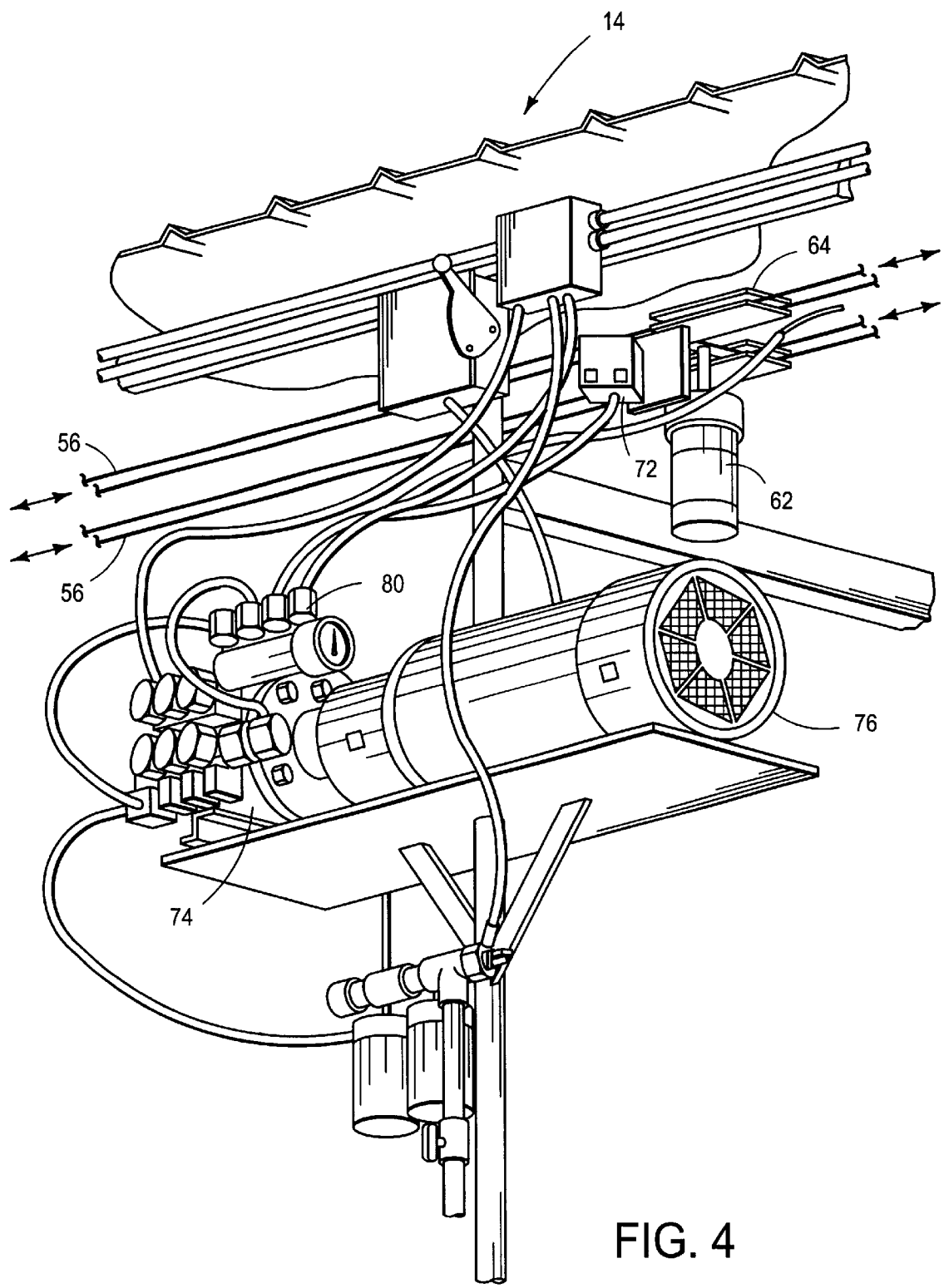

As an alternative embodiment to the system disclosed in FIGS. 1 and 4, a separate oscillation motor may be directly attached to each drive shaft 46, eliminating the need for linkage means such as cables 56 or rods. In this embodiment, each oscillation motor would be electrically connected to the oscillation motor variable frequency drive 66 located within the local control panel 68.

Water droplets are injected into the air stream 44 created by each fan 20. Water is delivered to the mist ring 28 of each fan 20 through a high pressure water line 32. Stainless steel or other corrosion resistant materials with acceptable pressures ratings are acceptable materials for construction of the mist ring 28. A plurality of nozzles 30 are attached to the mist ring 28. Nozzles 30 may be screwed into female connections welded to mist ring 28, or otherwise attached. Water is delivered into high pressure water line 32 by pump 74. Pump 74 may be a plunger pump available through General Pump of Mendota Heights, Minn. or Cat Pumps of Minneapolis, Minn. Pump 74 is driven by pump motor 76. The pump flow rate of pump 74, and thus outlet pressure, may be controlled by various pressure control means. The pump flow rate may be increased or decreased by controlling the revolutions per minute of motor 76 by controlling motor 76 with pump motor variable frequency drive 78, resulting in increased or decreased output pressure. Pump motor variable frequency drive 78 may be located in local control panel 68. Alternatively, output pressure of pump 74 may be controlled through a plurality of solenoid-activated by-pass valves 80. The solenoids are controlled by a thermostat set within local control panel 68, so that when required by hotter temperatures, the solenoids will sequentially close a by-pass valve 80 to increase pressure to nozzles 30, and water volume.

When water droplets are injected into the air stream 44 of each fan, there is the possibility of creating a drench, a mist, or a fog, depending upon, among other factors, including environmental conditions, the volume of injected water, the injection pressure, and the droplet size. A drench showers the animal, wetting the animal to its skin, but is not normally a suitable cooling method when the animal is in its bedding area or is being milked. With a mist, the water droplets injected into the air stream 44 are smaller than with a drench, but the air becomes saturated with continued water injection, resulting in the animals and bedding becoming wet. A mist creates an undesirable water layer on the animal which acts as an insulator and retains heat. With fog, water is emitted through very small diameter nozzles 30 at a sufficiently high pressure so as to result in extremely small water particles. These water particles will flash evaporate when the particles come into contact with any warm surface such as the skin of an animal or person, resulting in a cool animal environment with little wetting of the animal's hair-coat and virtually no wetting of the animal's bedding.

The disclosed system generates evaporative cooling by monitoring environmental conditions with environmental sensing devices, such as a temperature probe 82 and/or a humidity probe 84, and adjusting water pressure and water volume accordingly, and injecting water at high pressures through small diameter nozzles. The temperature probe 82 provides an analog temperature value to the local control panel 68. Likewise, the humidity probe 84 provides an analog humidity value to the local control panel 68. Acceptable temperature and humidity probes are available through Veris Industries, Inc. It has been found that a nozzle diameter of approximately 0.02 inches and injection pressures ranging from 500 to 1200 psi provide the desired water particle size of approximately 8 to 30 microns. The ability of the disclosed system to create a non-wetting fog is further enhanced because the oscillation of the fans 20 may be programmed as to the oscillation arc and the oscillation speed, so that the duration of water injection into a particular oscillation position of the fan 20 is programmable.

Figure 5:
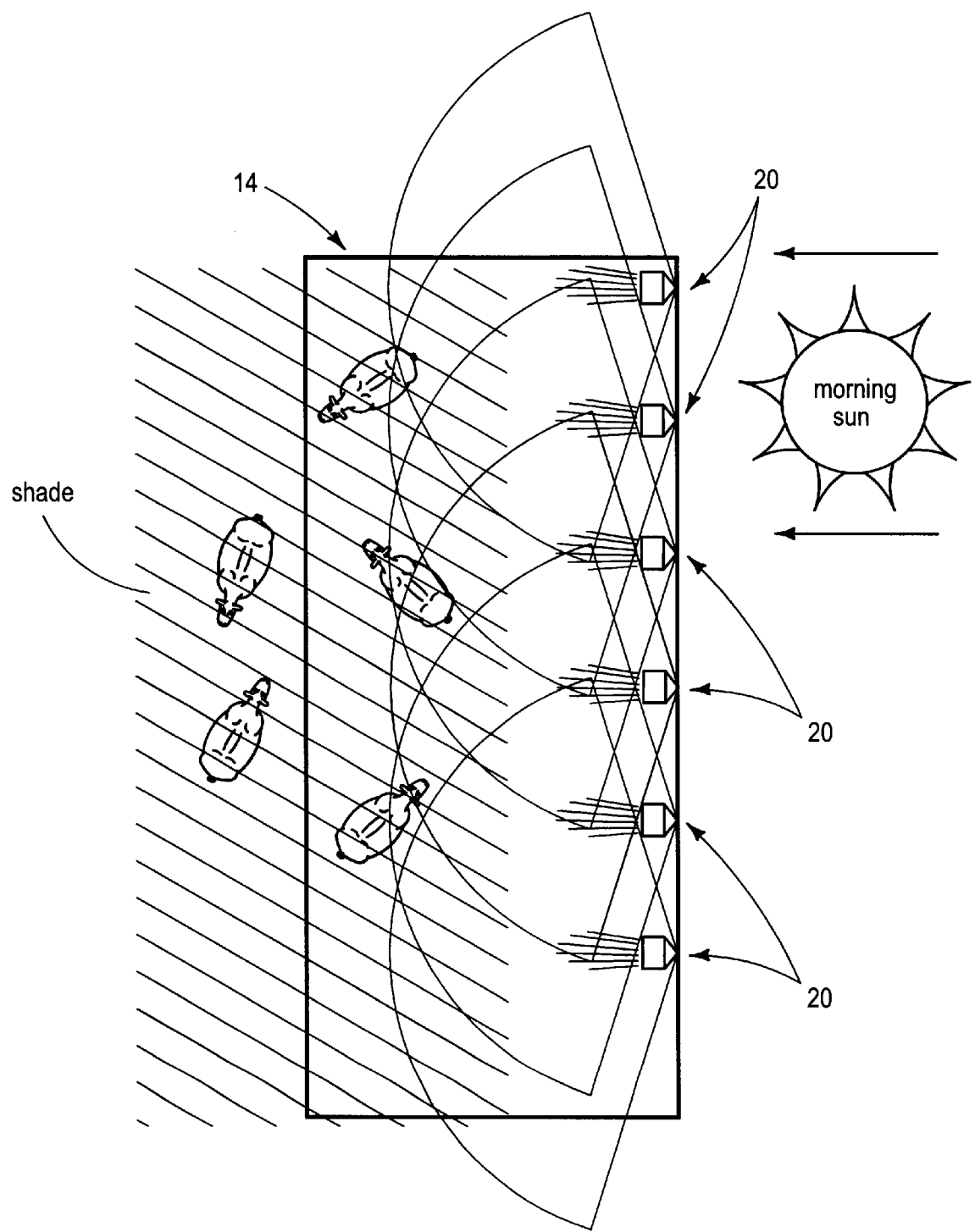
Figure 6:
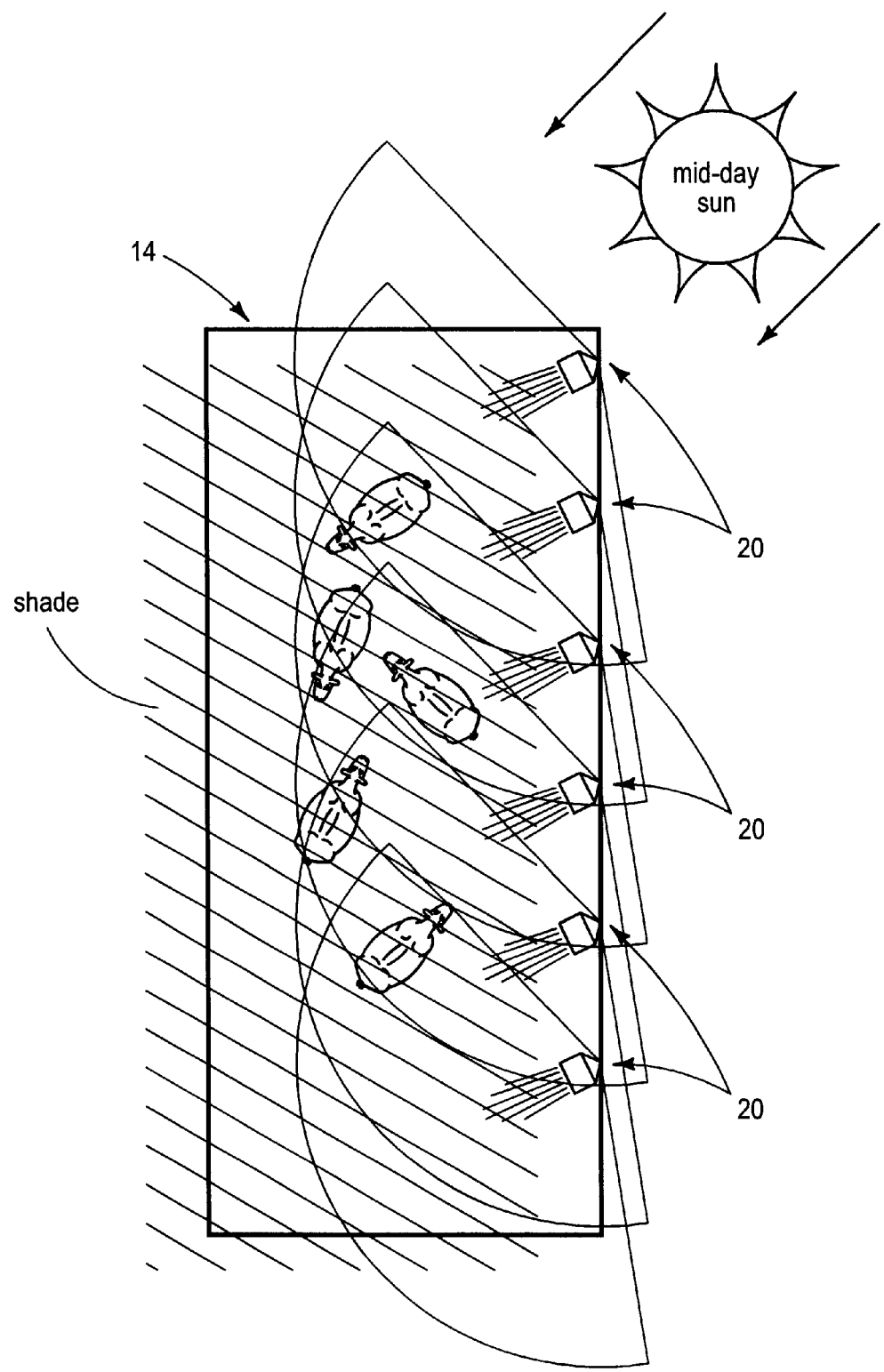
Figure 7:
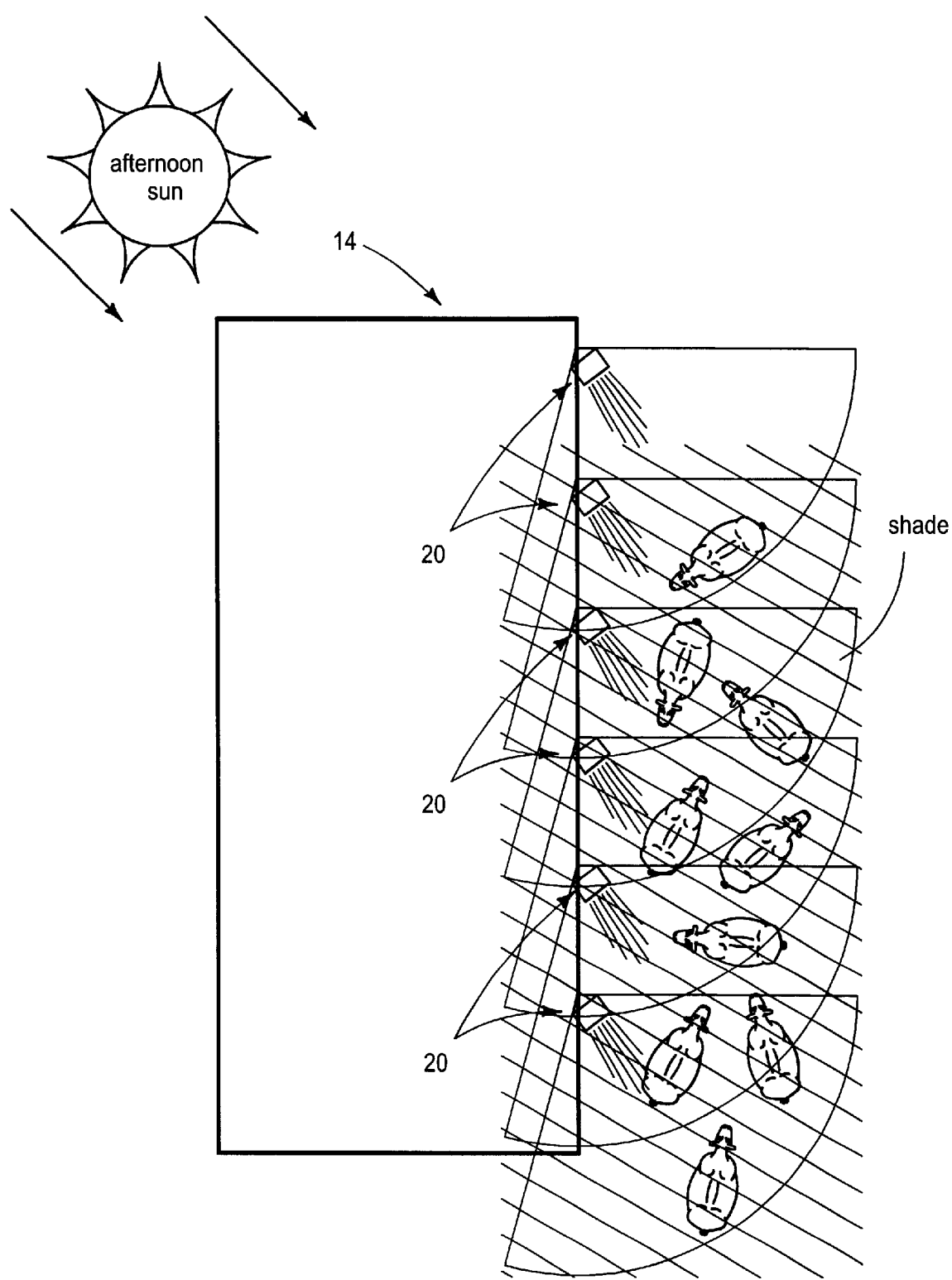

As shown in FIGS. 5 through 7, the plurality of fans 20 within a structure 14 oscillate together so that the air streams 44 of each fan are oriented in the same direction. Because of its ability to provide cooling fog to a particular zone at a particular time of day, the disclosed system provides the ability of the herdsman to program the system to provide a zone of comfort to livestock to the areas in which the livestock gather according to the time of day. In essence, the disclosed system creates a localized environment which is healthy and comfortable to the animals.

Figure 8:
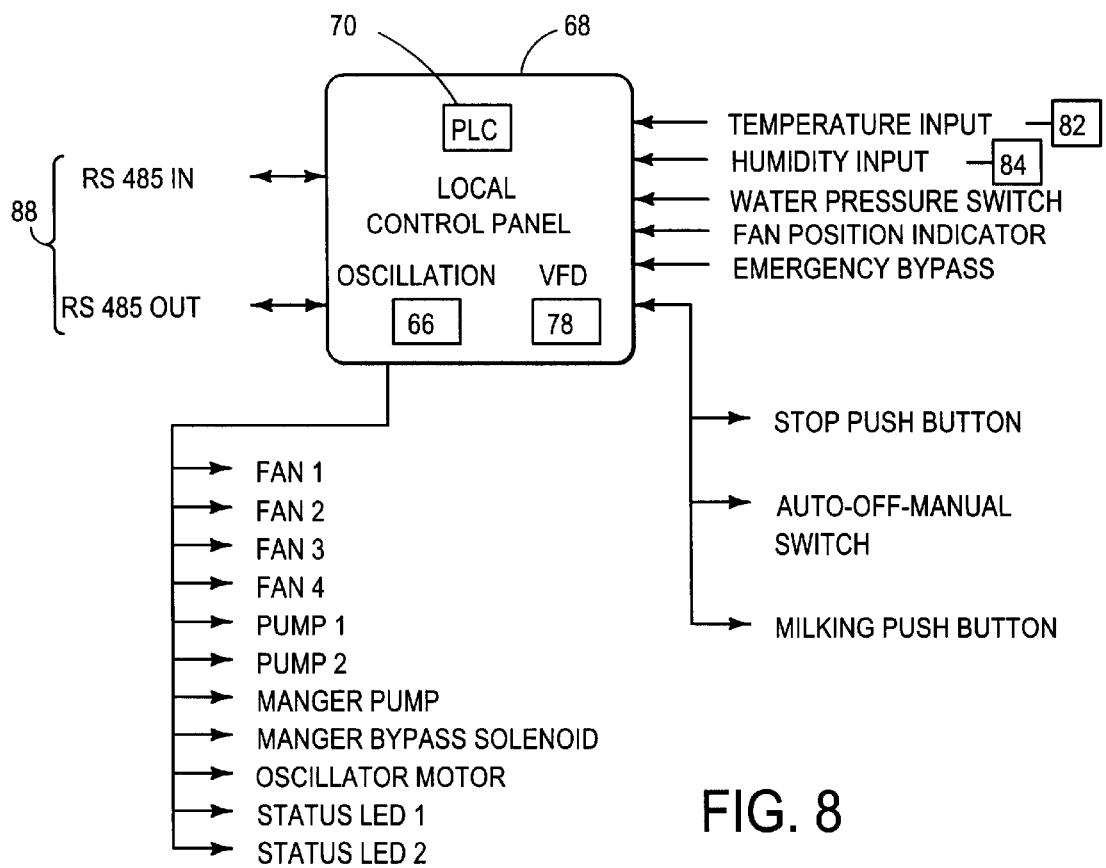

The control and monitoring stations of the disclosed system may be configured in several different ways. At its simplest, the system comprises a fan 20 or a circuit of fans 20, an oscillation motor 62 and related controls to oscillate the fans 20, a pump 74 for delivering water to the mist ring 28 of each fan, means for controlling the pump output pressure and volume, such as a pump motor variable frequency drive 78 or a plurality of by-pass valves 80, and a local control panel 68 containing a programmable controller 70, which based upon inputted values for environmental conditions such as temperature and humidity observed by the environmental sensing devices, sends output signals to control the zone of oscillation, the oscillation speed, and pump pressure to the nozzles 30, as shown in FIG. 8. The local control panel 68 may be configured to sequentially start each individual fan motor 24 to reduce peak demand in starting the system.

Figure 9:
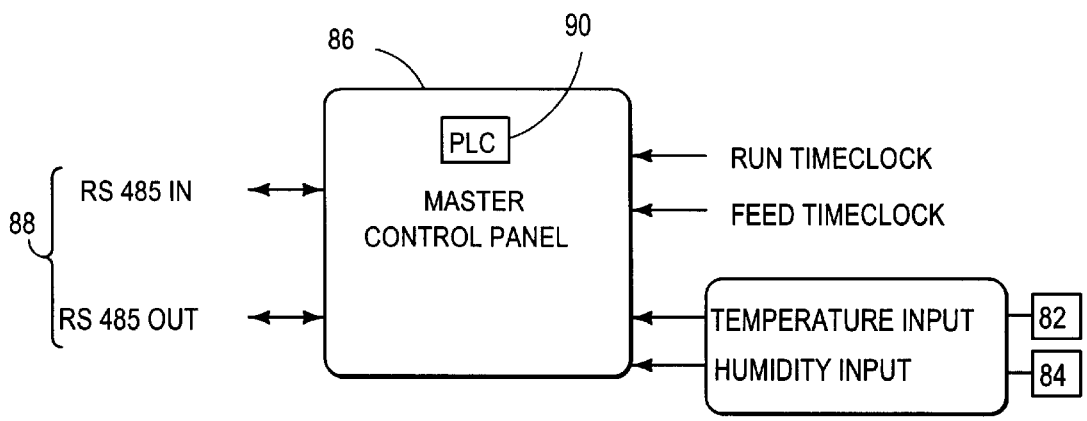
Figure 10:
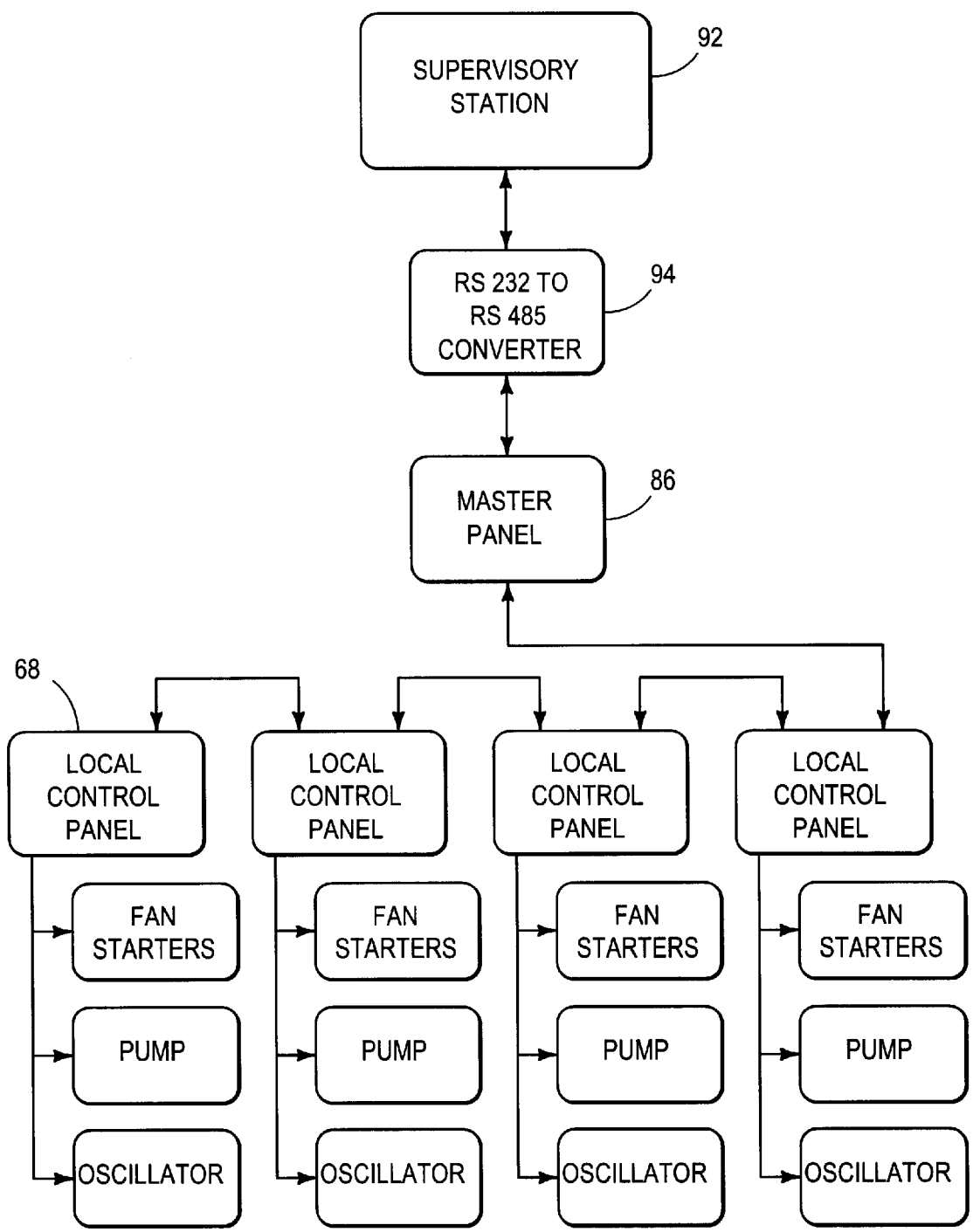

A master control panel 86, shown in FIG. 9, may be linked to the local control panel 68 with RS 485 input and output devices 88. The master control panel 86, which contains master panel programmable controller 90, may receive input signals from various time clocks and environmental sensing devices, such as a temperature probe 82 and a humidity probe 84, and send output signals to local control panel 68, and receive input signals from local control panel 68, thus making local control panel 68 a slave to master control panel 86. As shown in FIG. 10, a network of local control panels 68, each local control panel 68 connected to a fan circuit, may be controlled by a single master control panel 86, making the disclosed system adaptable for large dairy operations with a plurality of structures 14. As further shown in FIG. 10, a remote supervisory station 92 may be connected to the master control panel 86 with an RS 232 to RS 485 converter 94. The remote supervisory station 92 may be a personal computer platform with a Windows or equivalent operating system, using software known within the art for converting data received from the master control panel 86 to a format compatible with the PC. The remote supervisory station 92 would provide the operator whole dairy overview screens, and individual screens for the status of individual structures 14.

While the above is a description of various embodiments of the present invention, further modifications may be employed without departing from the spirit and scope of the present invention. For example, the size, shape, position and/or material of the various components may be changed as desired. Thus the scope of the invention should not be limited by the specific structures disclosed. Instead the true scope of the invention should be determined by the following claims.

What is claimed is:

1. A system for cooling livestock comprising:
    (a) a structure comprising a roof and supporting members, the roof connected to the supporting members;
    (b) an electrically-powered fan, the fan creating an air stream, said fan rotatably coupled to the structure;
    (c) oscillation means connected to the fan for rotating the fan through a plurality of rotational positions;
    (d) means for injecting water droplets into the air stream of the fan;
    (e) at least one sensing device positioned to sense environmental conditions and adapted to produce a signal in response to said conditions; and
    (f) input/output means for receiving the signal produced by the sensing device and outputting a signal limiting the plurality of rotational positions through which the fan is rotated.

2. A system for cooling livestock comprising:
    (a) a structure comprising a roof and supporting members, the roof connected to the supporting members;
    (b) an electrically-powered fan, the fan creating an air stream, said fan rotatably coupled to the structure;
    (c) oscillation means connected to the fan for rotating the fan through a plurality of rotational positions;
    (d) means for injecting water droplets into the air stream of the fan;
    (e) controller means comprising:
        (i) a control panel having programmable input/output means;
        (ii) a plurality of sensing devices positioned to sense environmental conditions and adapted to produce a signal in response to said conditions;
        (iii) a position indication device to determine the rotational position of the fan, said device adapted to produce a signal in response to said position;
        (iv) the programmable input/output means adapted for receipt and storage of input from the sensing devices and the fan position indication device, said programmable input/output means formed to produce an output signal based upon said input;
        (v) power means adapted to receive a signal produced by the programmable input/output means, said power means coupled to said oscillation means for operation of the same; and
        (vi) pressure control means adapted to receive a signal produced by the programmable input/output means, said pressure control means coupled to the means for injecting water droplets into the air stream for controlling the pressure of the same.

3. The system for cooling livestock of claim 2 wherein the environmental conditions being sensed comprise temperature.

4. The system for cooling livestock of claim 2 wherein the environmental conditions being sensed comprise humidity.

5. The system for cooling livestock of claim 2 wherein the power means comprise a first variable frequency drive coupled to an oscillation motor, the motor having a shaft.

6. The system for cooling livestock of claim 5 wherein the oscillation means comprise:
    (a) a drive shaft having a first end and a second end;
    (b) a drive gear attached to the first end of the drive shaft;
    (c) means for applying rotational motion to the drive shaft;
    (d) a pivot arm attached to the fan;
    (e) a free gear coupled to the pivot arm; and
    (f) a chain connecting the drive gear to the free gear so the means for applying rotational motion to the second end cause the drive gear to rotate turning the free wheel, pivot arm and fan.

7. The system for cooling livestock of claim 6 wherein the means for applying rotational motion comprise a drive arm coupled to the shaft of the oscillation motor, a pivot arm attached to the second end of the drive shaft, and linkage means connecting the drive arm to the pivot arm so that rotation of the shaft of the oscillation motor causes rotation of the drive arm, activating the linkage means, causing rotation of the drive shaft.

8. The system for cooling livestock of claim 2 wherein the pressure control means comprises a second variable frequency drive coupled to a second motor.

9. The system for cooling livestock of claim 2 wherein the pressure control means comprises a plurality of solenoid-activated by-pass valves connected to the programmable input/output means.

10. The system for cooling livestock of claim 7 wherein the linkage means comprise at least one rod.

11. The system for cooling livestock of claim 7 wherein the linkage means comprise a plurality of cables.

12. The system for cooling livestock of claim 2 wherein the means for injecting water droplets into the air stream comprise a pump coupled to the second motor, the pump hydraulicly connected to nozzles placed within the air stream.

13. The system for cooling livestock of claim 2 wherein a remote supervisory station is adapted to receive a signal produced by the programmable input/output means of the control panel and the programmable input/output means of the control panel is adapted to receive a signal produced by the remote supervisory station.

14. A system for cooling livestock comprising:
    (a) a plurality of structures, each structure comprising a roof and supporting members, the roof connected to the supporting members;
    (b) a plurality of fan circuits, each circuit comprising at least one electrically-powered fan electrically connected to a local control panel, each structure having at least one fan circuit;
    (c) each fan creating an air stream, with each fan rotatably attached to the structure;
    (d) oscillation means connected to each fan for rotating the fan through a plurality of rotational positions;
    (e) means for injecting water droplets into the air stream of each fan;
    (f) controller means comprising:
        (i) a master control panel having a first programmable input/output means adapted for receipt and storage of input communications and for transmitting output communications;
        (ii) a plurality of the local control panels in communication with the first programmable input/output means of the master control panel;

(iii) each local control panel having a second programmable input/output means adapted for receipt and storage of input communications and for transmitting output communications;

(iv) a plurality of sensing devices positioned to sense environmental conditions and adapted to produce a signal in response to said conditions, said signal inputted to the first programmable input/output means of the master control panel and transmitted by the first input/output means of the master control panel to the second programmable input/output means of each local control panel;

(v) a plurality of position indication devices to determine the rotational position of each fan within a fan circuit, said devices adapted to produce a signal in response to said position and transmit said signal to the second programmable input/output means of the local control panel for that fan circuit;

(vi) power means adapted to receive a signal produced by the second programmable input/output means, said power means coupled to said oscillation means for operation of the same; and (vii) pressure control means adapted to receive a signal produced by the second programmable input/output means, said pressure control means coupled to the means for injecting water droplets into the air stream for controlling the pressure of the same.

15. The system for cooling livestock of claim 14 wherein a remote supervisory station is adapted to receive a signal produced by the first programmable input/output means of the master control panel and the first programmable input/output means of the master control panel is adapted to receive a signal produced by the remote supervisory station.

16. A system for cooling livestock comprising:

(a) a plurality of structures, each structure comprising a roof and supporting members, the roof connected to the supporting members;

(b) a plurality of fan circuits, each circuit comprising at least one electrically-powered fan electrically linked to a local control panel, each structure having at least one fan circuit;

(c) each fan creating an air stream, the fan rotatably attached to the structure;

(d) oscillation means connected to each fan for rotating the fan through a plurality of rotational positions;

(e) means for injecting water droplets into the air stream of each fan;

(f) controller means comprising:

(i) a master control panel having a first programmable input/output means adapted for receipt and storage of input communications and adapted for transmitting output communications;

(ii) a plurality of the local control panels connected in series, including a first local control panel in communication with the first programmable input/output means of the master control panel;

(iii) each local control panel having a second programmable input/output means adapted for receipt and storage of input communications and adapted for transmitting output communications;

(iv) a second local control panel in communication with the second programmable input/output means of the first local control panel, and, likewise, a plurality of local control panels in series wherein each successive local control panel in the series is in communication with the second programmable input/output means of the preceding local control panel;

(v) a plurality of sensing devices positioned to sense environmental conditions and adapted to produce a signal in response to said conditions, said signal inputted to the first programmable input/output means of the master control panel and transmitted by the same to the second programmable input/output means of the first local control panel;

(vi) a plurality of position indication devices to sense the rotational position of each fan within a fan circuit, said devices adapted to produce a signal in response to said position and transmit said signal to the second programmable input/output means of the local control panel for that fan circuit;

(vii) power means adapted to receive a signal produced by the second programmable input/output means, said power means coupled to said oscillation means for operation of the same; and (viii) pressure control means adapted to receive a signal produced by the second input/output means, said pressure control means said pressure control means coupled to the means for injecting water droplets into the air stream for controlling the pressure of the same.

* * * * *